United States Patent
Cangioli et al.

(10) Patent No.: US 12,326,095 B2
(45) Date of Patent: Jun. 10, 2025

(54) INTEGRATED HERMETICALLY SEALED TURBOEXPANDER-GENERATOR WITH AN ELECTRIC GENERATOR AT AN END OF A COMMON SHAFT LINE

(71) Applicant: NUOVO PIGNONE TECNOLOGIE—S.R.L., Florence (IT)

(72) Inventors: Francesco Cangioli, Florence (IT); Davide Biliotti, Florence (IT); Massimiliano Ortiz Neri, Florence (IT); Giuseppe Sassanelli, Florence (IT); Vittorio Michelassi, Florence (IT)

(73) Assignee: Nuovo Pignone Tecnologie—S.R.L., Florence (IT)

( * ) Notice: Subject to any disclaimer, the term of this patent is extended or adjusted under 35 U.S.C. 154(b) by 0 days.

(21) Appl. No.: 17/907,200

(22) PCT Filed: Mar. 19, 2021

(86) PCT No.: PCT/EP2021/025111
§ 371 (c)(1),
(2) Date: Sep. 23, 2022

(87) PCT Pub. No.: WO2021/197665
PCT Pub. Date: Oct. 7, 2021

(65) Prior Publication Data
US 2023/0332508 A1    Oct. 19, 2023

(30) Foreign Application Priority Data
Mar. 31, 2020    (IT) .......... 102020000006727

(51) Int. Cl.
*F01D 25/24*    (2006.01)
*F01D 15/10*    (2006.01)
(Continued)

(52) U.S. Cl.
CPC ............ *F01D 25/24* (2013.01); *F01D 15/10* (2013.01); *F02C 6/18* (2013.01); *F02C 7/06* (2013.01);
(Continued)

(58) Field of Classification Search
CPC .. F01D 25/24; F01D 15/10; F02C 6/18; F02C 7/06; H02K 7/09; H02K 7/1823;
(Continued)

(56) References Cited

U.S. PATENT DOCUMENTS 6,651,433 B1 * 11/2003 George, Jr. ............... F02C 3/00
60/614
2004/0093869 A1    5/2004 Larjola et al.
(Continued)

FOREIGN PATENT DOCUMENTS

| CN | 1653253 A | 8/2005 |
|---|---|---|
| CN | 110159429 A | 8/2019 |

(Continued)

*Primary Examiner* — Viet P Nguyen
(74) *Attorney, Agent, or Firm* — Paul Frank + Collins P.C.

(57) ABSTRACT

An integrated hermetically sealed turboexpander-generator comprises a hermetically sealed casing arrangement, a turboexpander, a compressor and an electric generator, arranged in the hermetically sealed casing arrangement along a common shaft line, supported by active magnetic bearings. Also disclosed is a thermodynamic system using the integrated hermetically sealed turboexpander-generator to convert waste heat from a waste heat source into electric power. The electric generator is arranged at one end of the common shaft line.

11 Claims, 6 Drawing Sheets

(51) Int. Cl.
*F02C 6/18* (2006.01)
*F02C 7/06* (2006.01)
*H02K 7/09* (2006.01)
*H02K 7/18* (2006.01)

(52) U.S. Cl.
CPC ............ *H02K 7/09* (2013.01); *H02K 7/1823* (2013.01); *F05D 2220/76* (2013.01); *F05D 2240/51* (2013.01); *F05D 2240/55* (2013.01); *F05D 2260/211* (2013.01)

(58) Field of Classification Search
CPC ............ F05D 2220/76; F05D 2240/51; F05D 2240/55; F05D 2260/211
See application file for complete search history.

(56) References Cited

U.S. PATENT DOCUMENTS

| | | |
|---|---|---|
| 2005/0056001 A1 | 3/2005 | Frutschi et al. |
| 2006/0197345 A1 | 9/2006 | Kuroki et al. |
| 2013/0241203 A1 | 9/2013 | Kleen et al. |
| 2014/0119881 A1 | 5/2014 | Kalra et al. |
| 2017/0016577 A1* | 1/2017 | Sinatov ................. F25J 1/0228 |
| 2019/0041124 A1 | 2/2019 | Berti et al. |
| 2019/0249599 A1 | 8/2019 | Sen et al. |
| 2021/0254510 A1 | 8/2021 | Waki et al. |

FOREIGN PATENT DOCUMENTS

| | | |
|---|---|---|
| FR | 1336318 | 8/1963 |
| JP | 2003193865 A | 7/2003 |
| WO | 02/23014 A1 | 3/2002 |
| WO | 2002023014 A1 | 5/2004 |
| WO | 2016137442 A1 | 9/2016 |
| WO | 2017/153387 A1 | 9/2017 |

\* cited by examiner

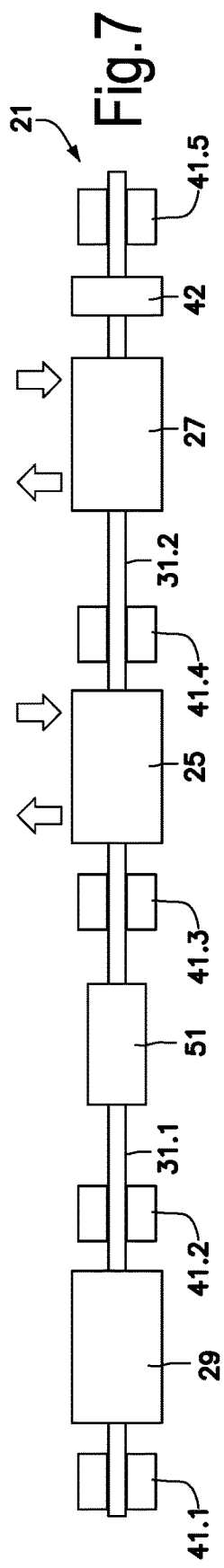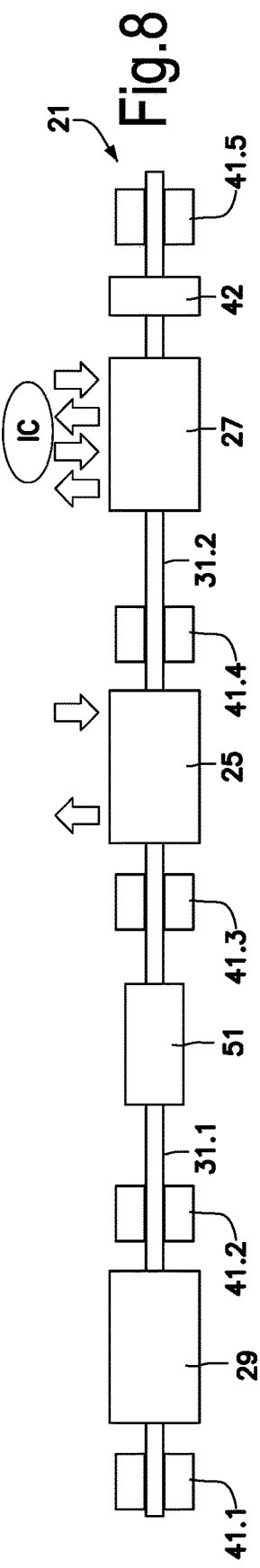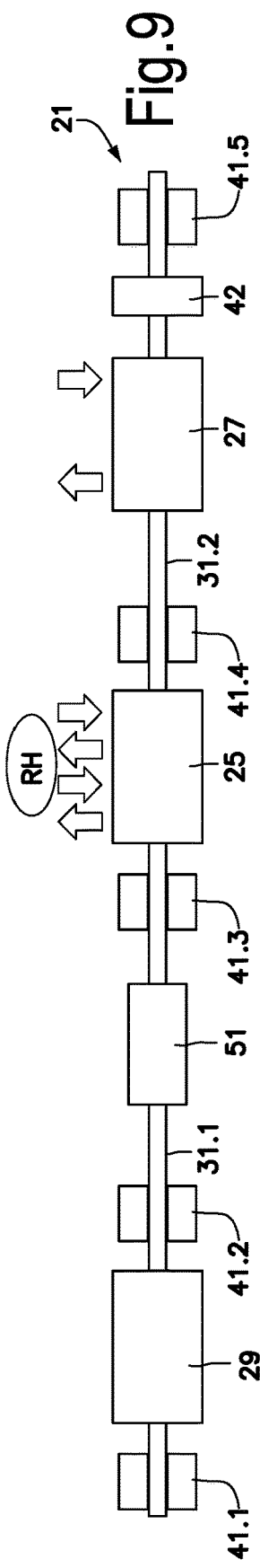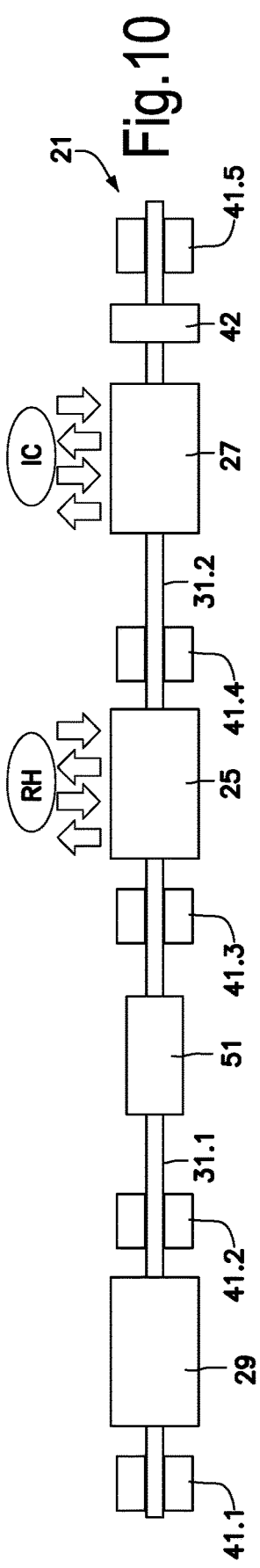

INTEGRATED HERMETICALLY SEALED TURBOEXPANDER-GENERATOR WITH AN ELECTRIC GENERATOR AT AN END OF A COMMON SHAFT LINE

TECHNICAL FIELD

Disclosed herein are integrated turbomachines. More specifically, embodiments of the present disclosure concern combined turbomachines and generators adapted to convert thermal energy into electrical energy.

The present disclosure also concerns thermodynamic systems including turbomachines and generators for waste heat recovery.

BACKGROUND ART

Several industrial processes produce a large amount of waste heat. Typical examples of waste heat generating processes are industrial processes for steel, glass and cement production. Other examples are thermodynamic processes for the generation of mechanical or electric power by conversion of thermal power generated by fuel combustion. Typically, power generation processes using fuel convert less than 45% of the thermal power generated by combustion into useful electric or mechanical power. The temperatures of the exhaust combustion gas range typically between 300° C. and 700° C. and the exhaust thermal power can be worth multi MW (megawatt). The heat contained in the exhaust combustion gas is discharged in the environment and wasted. This has a severe environmental impact.

Systems already exist, which allow capturing part of the waste heat and convert it into useful power, or use it as such, for instance for heating of buildings. However, existing systems for converting part of the waste heat in useful electrical or mechanical power are complex and expensive, require large footprint and are demanding in terms of operational costs. They may also underperform in off design conditions.

A need therefore exists for machines and systems, which overcome or alleviate one or more of the drawbacks of the systems of the current art mentioned above.

SUMMARY

Disclosed herein is an integrated hermetically sealed turboexpander-generator, comprising a hermetically sealed casing arrangement, wherein a turboexpander, a fluid pressurizing turbomachine and an electric generator are arranged. The turboexpander, the electric generator and the fluid pressurizing turbomachine are mounted along the same shaft line, such that they rotate at the same speed. The electric generator is arranged at one end of the shaft line, so that thermal load thereon is minimized.

As used herein, a fluid pressurizing turbomachine is a turbomachine adapted to pressurize the working fluid flowing through the integrated machine. If the fluid is in a liquid state, the fluid pressurizing turbomachine includes a pump. If the fluid is in the gaseous state, the fluid pressurizing turbomachine includes a compressor. The nature of the fluid pressurizing turbomachine used depends mainly on the kind of thermodynamic cycle in which the integrated hermetically sealed turboexpander-generator is used. Usually, the fluid pressurizing turbomachine comprises a compressor, as Brayton cycles or other cycles not involving a change of phase of the working fluid are preferably involved in waste heat recovery. However, the possibility is not excluded of using a Rankine cycle or other cycles involving a phase change in the working fluid. In such case usually the fluid pressurizing turbomachine includes a pump.

As used herein, a hermetically sealed casing arrangement may include a single casing, which houses the three rotary machines mentioned above, with a common shaft extending therethrough. Rotary seals can be provided along the shaft, to prevent leakages from one rotary machine to the other, for example to separate the cooling gas of the electric generator from the working fluid processed through the turboexpander and the fluid pressurizing turbomachine. No rotary parts of the machine are however exposed outside the casing arrangement, such that leakages towards the environment are prevented.

The hermetically sealed casing arrangement may, however, also include two or more casings, each of which is hermetically sealed and houses one or two of the rotary machines mentioned above, i.e. the turboexpander, the fluid pressurizing turbomachine and the electric generator. In such case, torque is transmitted from one casing to the other through a magnetic joint, such that also in this case no rotating mechanical part is exposed towards the exterior of the casing arrangement, which remains hermetically sealed as a whole.

As used herein, a common shaft line can consist of a single shaft or of shaft line portions, i.e. separate shafts, which are coupled to one another physically by a joint, such as a flexible joint, or magnetically, through a magnetic joint, such that the whole shaft line rotates at the same rotary speed, except as far as the oscillations permitted by the joint are concerned. No gears or speed manipulating devices are required between rotary machines.

The common shaft line of the turboexpander, electric generator and fluid pressurizing turbomachine is supported by active magnetic bearings, thus avoiding the use of rolling bearings, as well as hydrostatic or hydrodynamic bearings. A lubricant or load bearing fluid circuit is thus not required, making the integrated and hermetically sealed machine simpler, less expensive and less critical as far as potential lubricant leakages are concerned.

In embodiments, the same working fluid is used also for cooling the active magnetic bearings of the integrated, hermetically sealed turboexpander-generator and for further cooling the electric generator.

The integrated, hermetically sealed turboexpander-generator is thus connected to the outside world only through the following:
 fluid inlet and fluid outlet, hermetically sealed flanges of the turboexpander, which connect the turboexpander to the heater required to heat the working fluid, such as a heat exchanger receiving waste heat from a waste heat source;
 inlet and outlet hermetically sealed compressor or pump flanges, connected to the external cooling system;
 power cables powering the active magnetic bearings;
 power cables of the electric generator.

If required, additional flanges can be provided for circulating a cooling medium through or around the active magnetic bearings and the electric generator. As mentioned, the same working fluid can be used as cooling medium for the active magnetic bearings and/or for the electric generator. Suitable heat exchangers can be provided to keep the working fluid circulating in the active magnetic bearings and electric generator at suitable temperature, removing heat form the active magnetic bearings and from the electric generator.

No rotary mechanical component projects from the hermetically sealed casing arrangement towards the environment.

At least one of the turboexpander and the fluid pressurizing turbomachine is arranged between bearings, i.e in an in-between bearings configuration. In some embodiments, both turbomachines are arranged in an in-between arrangement. In other embodiments, one of the turbomachines is arranged in-between bearings, i.e. between two radial bearings, while the other is arranged in an overhung manner at one end of the shaft line. The electric generator is usually arranged between radial bearings.

In currently preferred embodiments, both the turboexpander and the fluid pressurizing turbomachine are multi section turbomachines, in which each section comprises at least one stage. The multi-stage/multi-section configuration allows reaching high pressure and temperature ratios, adapted to achieve high thermodynamic cycle efficiencies.

A compact combined, hermetically sealed machine is thus provided, which has limited dimensions and reduced cost.

Thus, the three machines (turboexpander, fluid pressurizing turbomachine and electric generator) required to convert waste heat into useful electric power are merged in a single, integrated, hermetically sealed machine. The hermetical seal avoids gas leakages in any operating conditions, thereby avoiding the need for any working fluid reintegration and also avoiding environmental pollution.

The use of active magnetic bearing avoids the need for any lubrication and possible contamination of the working fluid by the lubricant.

The single shaft line is driven by the turboexpander (turbine) that drives both driven machines, namely the electric generator and the fluid pressurizing turbomachine (compressor or pump). This simple layout allows large flexibility in the assembly, as it is possible to include turboexpander reheating and/or compressor intercooling without modifying the machine.

Embodiments and features of the integrated hermetically sealed turboexpander-generator are outlined below, reference being made to the attached drawings, and are set forth in the appended claims, the content whereof form an integral part of the present description.

Disclosed herein is also a thermodynamic system including a waste heat source, adapted to directly or indirectly transfer heat to a working fluid processed through an integrated, hermetically sealed turboexpander-generator as outlined above, to convert part of the waste heat into electrical power.

Embodiments of the thermodynamic system are described below with reference to the attached drawings.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein:

FIGS. 3 to 10 illustrate schematics of the integrated turboexpander-generator in several embodiments;

DETAILED DESCRIPTION

To provide a more compact and less expensive thermodynamic system for recovering waste heat, a hermetically sealed integrated turboexpander-generator is disclosed herein, which includes a hermetically sealed casing arrangement, which houses a turboexpander and a fluid pressurizing turbomachine, in combination with the electric generator, which converts mechanical power generated by the turboexpander into electric power. The integrated, hermetically sealed combined machine avoids leakages along rotary shafts towards the outside environment, and avoids the need to connect separate rotary machines by shafts extending through the respective casings. A compact and leakage-free combination of rotary machines is thus obtained. A common shaft line, including the rotor of the electric generator, the rotary parts of the turboexpander and the rotary parts of the fluid pressurizing turbomachine, is supported by active magnetic bearings, such that lubrication circuits can be dispensed with. To reduce heat load on the electric generator, this latter is arranged at one end of the shaft line. Several useful arrangements of the various rotary machines will be described in detail here below.

The integrated turboexpander-generator can be used in a closed Brayton cycle using a suitable working fluid such as $CO_2$ in a supercritical cycle. The fluid pressuring turbomachine will in such case include a compressor. The use of a Rankine cycle for waste heat recovery is, however, not excluded. In such case the fluid pressurizing turbomachine includes a pump.

In the following description reference will be made to a system using waste heat from the exhaust combustion gas from a gas turbine engine. Those skilled in the art will nevertheless understand that the integrated turboexpander-generator and the relevant thermodynamic cycle disclosed herein can be used for recovering waste heat from other sources, such as any industrial process which produces waste heat at a suitable temperature as a by-product of the process. Different working fluids can be used in the thermodynamic cycle depending, inter alia, upon the temperature level of the waste heat. Specifically, supercritical carbon dioxide cycles can be used, but the use of other working fluids, e.g. other organic fluids such as pentane and cyclopentane, is not excluded.

Figure 1:
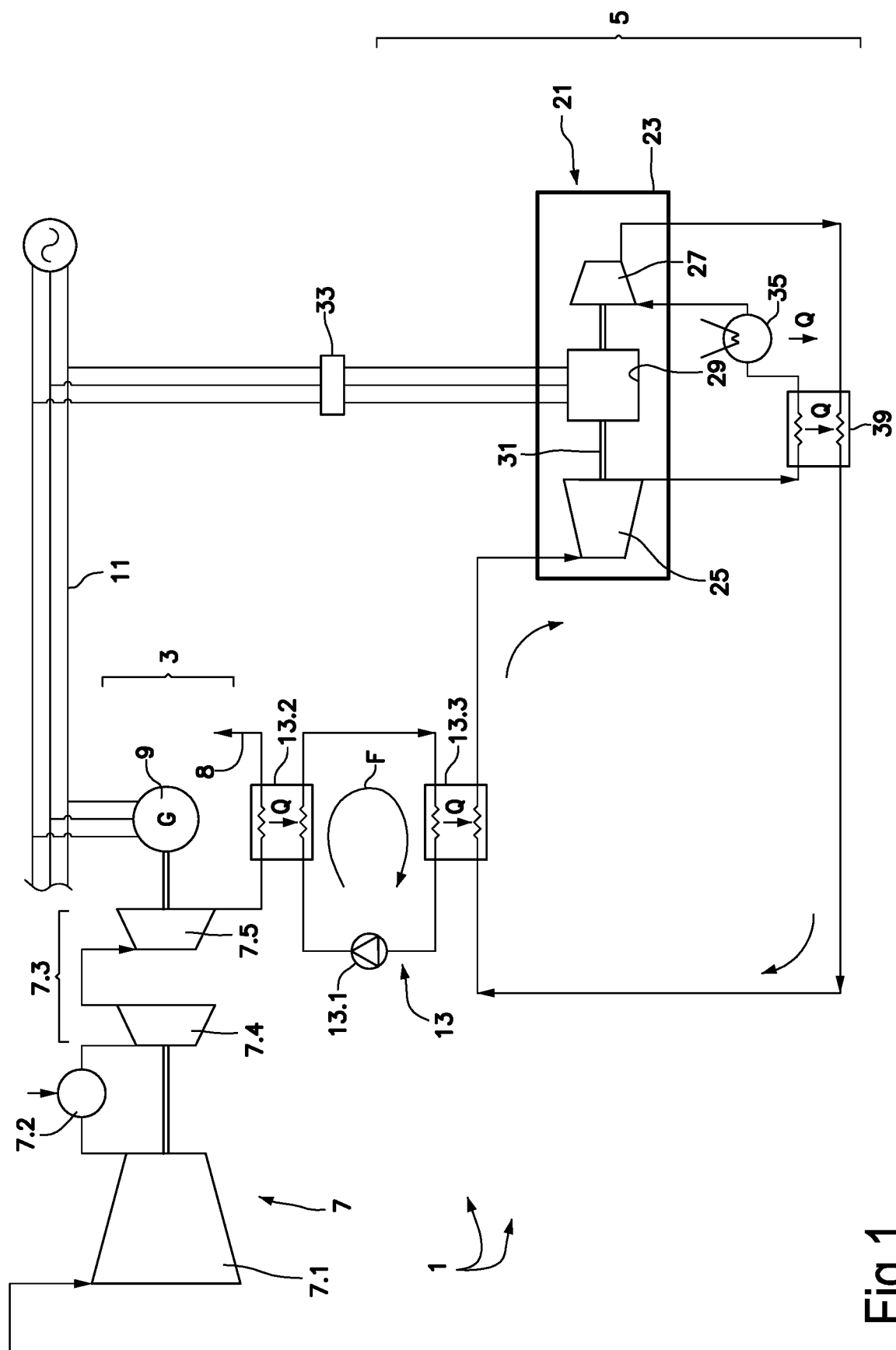
FIGS. 1 and 2 illustrate schematics of a thermodynamic system according to the present disclosure in two embodiments.

Referring now to FIG. 1, a simplified thermodynamic system 1 includes a source of waste heat 3 and a waste heat recovery circuit 5. In the embodiment of FIG. 1 the waste heat source includes a gas turbine engine 7, which is configured for power generation, i.e. for generating electric power through an electric generator 9, electrically coupled to an electric power distribution grid 11.

In other embodiments, the gas turbine engine 7 can be configured for mechanical drive, i.e. the mechanical power generated by the gas turbine engine 7 can be used as such, rather than being converted into electric power. Mechanical power can be exploited to drive a compressor or a compressor train, for instance in a natural gas liquefaction system or in a gas pipeline.

In the exemplary embodiment of FIG. 1 the gas turbine engine 7 is a two-shaft gas turbine engine, including an air compressor 7.1, a combustion chamber 7.2 and a turbine section 7.3. The turbine section 7.3 comprises a high-pressure turbine 7.4 and a low-pressure turbine 7.5. In a manner known per se, the high-pressure turbine 7.4 is mechanically coupled to the air compressor 7.1 and the low-pressure turbine 7.5 is mechanically coupled to the electric generator 9. Compressed air from the air compressor 7.1 is mixed with fuel and the mixture is ignited, to generate compressed, high-temperature combustion gas in combustion chamber 7.2. The compressed, high-temperature combustion gas is expanded sequentially in the high-pressure turbine 7.4 to generate power to drive the air compressor 7.1, and in the low-pressure turbine 7.5 to generate power to drive the electric generator 9.

While in FIG. 1 a two-shaft gas turbine engine is illustrated, in other embodiments the gas turbine engine 7 may be a one-shaft gas turbine engine, or a three-shaft gas turbine engine, or any kind of gas turbine engine adapted to generate mechanical power for mechanical drive or electric generation purposes, as the case may be. The gas turbine engine 7 can be a heavy-duty gas turbine engine, or an aero-derivative gas turbine engine.

The exhaust combustion gas is discharged from the gas turbine engine 7 through a stack 8. The exhaust combustion gas contains thermal energy at a temperature which may be as high as 700° C. The waste heat recovery circuit 5 is used to convert part of said waste heat into further useful power, specifically in the form of electric power.

In the embodiment of FIG. 1, waste heat is transferred from the gas turbine engine 7 to the waste heat recovery circuit 5 through an intermediate heat transfer loop 13, for safety reasons. In this way, a working fluid processed in the waste heat recovery circuit 5 does not circulate around the gas turbine engine 7. This is particularly useful if the working fluid used in the waste heat recovery circuit is a flammable or explosive fluid, e.g. an organic fluid such as cyclo-pentane.

A pump 13.1 circulates a heat transfer fluid (arrow F) in the closed intermediate heat transfer loop 13 through a first heat exchanger 13.2 and through a second heat exchanger 13.3. The first heat exchanger 13.2 is arranged upstream of the stack 8. In the first heat exchanger 13.2 the heat transfer fluid is in heat exchange relationship with the exhaust combustion gas discharged by the gas turbine engine 7 towards the stack 8. Heat is transferred from the exhaust combustion gas to the heat transfer fluid. In the second heat exchanger 13.3 the heat transfer fluid is in heat exchange relationship with the working fluid processed through the waste heat recovery circuit 5, for instance supercritical $CO_2$, or another organic fluid and heat is transferred from the heat transfer fluid to the working fluid.

In other embodiments, not shown, the intermediate heat transfer loop 13 can be dispensed with. This is particularly the case if the working fluid is not flammable or explosive, for instance, if $CO_2$ is used. If no intermediate heat transfer loop 13 is used, a heat exchanger is provided between the gas turbine engine 7 and the stack 8, through which heat is directly exchanged between the exhaust combustion gas and the working fluid circulating in the waste heat recovery circuit 5.

The waste heat recovery circuit 5 includes an integrated turboexpander-generator 21, wherein the rotary machinery required to convert waste heat into electric power is housed in a hermetically sealed casing 23. As used herein, a "hermetically sealed casing" is a casing, which has inlet and outlet flanges for the circulation of the working fluid, but does not have a rotary shaft protruding therefrom or facing the environment, such that no rotary seals are required and fluid leakages along rotary shafts are avoided.

A hermetically sealed casing can be formed by one or more casing sections, coupled to one another such that the rotary components of the turboexpander-generator are entirely and sealingly housed in the casing, while torque is transmitted from one casing section to the other through a magnetic joint, without the need for a mechanical transmission.

While several embodiments of the turboexpander-generator will be described in detail with reference to the following FIGS. 3 to 10, in FIG. 1 the turboexpander-generator 21 is illustrated only schematically as broadly including a turboexpander 25, a fluid pressurizing turbomachine 27 and an electric generator 29, mounted along a common shaft line 31. In the following description of several embodiments, the fluid pressurizing turbomachine 27 includes a compressor, as in preferred embodiments the working fluid circulating in the waste heat recovery circuit 5 performs a closed Brayton cycle, with no changes of phase of the working fluid. The use of a Rankine cycle is however not excluded. In such case the working fluid undergoes cyclic change of phase. In this case the fluid pressurizing turbomachine will include a turbopump.

High-pressure and high-temperature working fluid from the second heat exchanger 13.3 of the heat transfer loop 13 is expanded in the turboexpander 25 and heat contained in the working fluid is partly converted into mechanical power available on shaft line 31. The mechanical power is partly used to drive the compressor 27 and the exceeding mechanical power is converted into electric power by the electric generator 29. The electric power is delivered to the electric power distribution grid 11, possibly through a variable frequency drive (VFD) 33.

The expanded working fluid from the turboexpander 25 is chilled in a heat exchanger or heat sink 35, and delivered to the compressor 27. The compressed working fluid is delivered by the compressor 27 back to the heat exchanger 13.3.

The embodiment of FIG. 1 further comprises a heat recuperator 39 upstream of the heat sink 35. The heat recuperator 39 includes a heat exchanger that transfers heat from the expanded working fluid to the compressed working fluid, between the delivery side of compressor 27 and the second heat exchanger 13.3.

The waste heat recovery circuit 5 of FIG. 1 is a simplified circuit. A more complex waste heat recovery circuit 5 is illustrated in the embodiment of FIG. 2, where the same reference numbers indicate identical or equivalent parts as those shown in FIG. 1 and described above.

Figure 2:
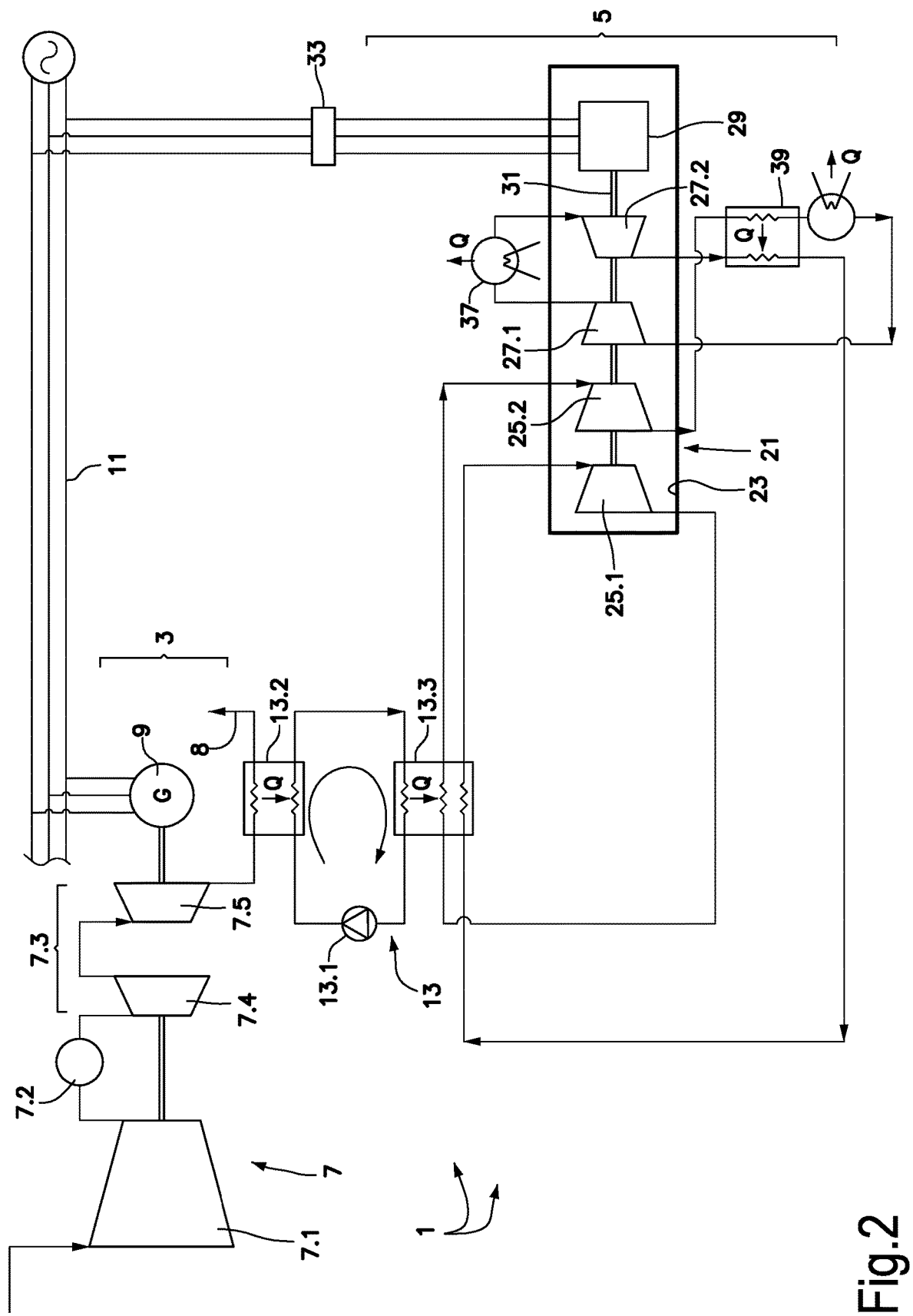

In FIG. 2 the integrated turboexpander-generator 21 includes a two-section turboexpander 25 and a two-section compressor 27.

The first and second turboexpander sections are labeled 25.1 and 25.2, respectively and are arranged in series, i.e. in sequence. The compressed and heated working fluid from the second heat exchanger 13.3 is partly expanded in the first turboexpander section 25.1 and further expanded to the final low pressure in the second turboexpander section 25.2.

In the embodiment of FIG. 2 the turboexpander 25 is a reheated turboexpander. The partly expanded working fluid discharged from the first turboexpander section 25.1 is reheated in the second heat exchanger 13.3 prior to be subject to final expansion in the second turboexpander section 25.2.

The first and second compressor sections are labeled 27.1 and 27.2 and are arranged in series. The expanded working fluid from the turboexpander 25 is partly compressed in the first compressor section 27.1 and further compressed to the final high-pressure in the second compressor section 27.2.

In the embodiment of FIG. 2 the compressor 27 is an intercooled compressor. The partly compressed working fluid delivered by the first compressor section 27.1 is cooled in an intercooler heat exchanger 37 before being processed through the second compressor section 27.2.

Moreover, the waste heat recovery cycle 5 of FIG. 2 further comprises a heat recuperator 39. The heat recuperator 39 is aimed at exchanging heat between the expanded working fluid discharged by the second turboexpander section 25.2 and the compressed working fluid delivered by the second compressor section 27.2. Since the expanded working fluid discharged by the second turboexpander section 25.2 is at a higher temperature than the compressed working fluid delivered by the second compressor section 27.2, the recuperator 39 allows recovery of low-temperature heat from the exhaust working fluid, thus increasing the overall efficiency of the cycle.

While in FIG. 2 reheating, intercooling and heat recuperation are provided in combination, it shall be understood that in other embodiments, not shown, one or two of these efficiency-enhancing arrangements may be foreseen. For example, an intercooled compressor can be used in a cycle with heat recuperation but without reheating, or else with reheating and without heat recuperation. Similarly, heat recuperation can be used alone, without compressor intercooling and without reheating, or with an intercooled compressor without reheating, or else with reheating but without compressor intercooling.

In all embodiments, the rotary machines required to convert heat into electric power, namely turboexpander, compressor and electric generator, are all housed in the same hermetically sealed casing 21, with the rotary components of the machinery on the same shaft line.

As will become apparent from the following description of various embodiments of the integrated turboexpander-generator 21, the sequence in which the rotary machines are arranged in the casing 23 can be different from what is schematically shown in FIGS. 1 and 2.

With continuing reference to FIGS. 1 and 2, the following FIGS. 3 to 10 schematically illustrate different arrangements of the machinery forming the integrated turboexpander-generator and compressor 21. FIGS. 3 to 10 show only schematically the rotary components of the integrated turboexpander-generator 21 and the mutual relationship therebetween. The outer hermetically sealed casing is omitted.

In all embodiments a single shaft line is provided, which is supported for rotation by a plurality of active magnetic bearings. As will be described in more detail below, the shaft line can include a single shaft, or a plurality of shafts, i.e. shaft line portions, for instance two shafts, drivingly coupled to one another by respective joints, to form a single shaft line where all shafts or shaft portions rotate at the same rotary speed, except the difference due to angular oscillations allowed by a flexible joint, if any, provided along the shaft line.

Figure 3:
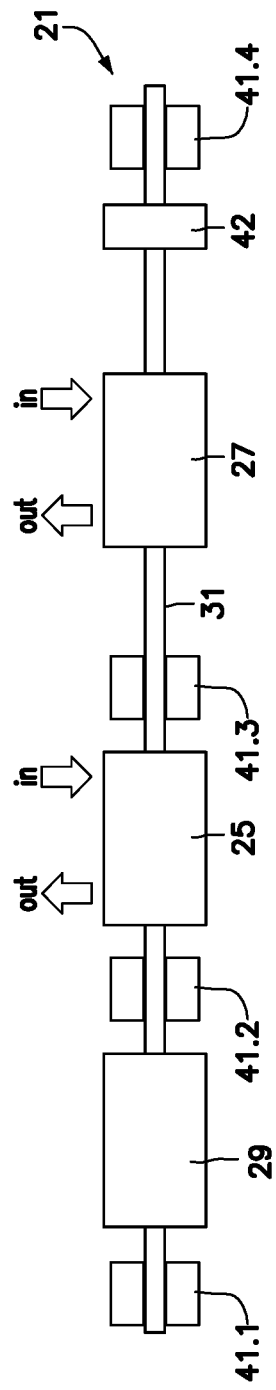

Referring now to FIG. 3, in one embodiment the integrated turboexpander-generator 21 includes the shaft line 31 formed by a single shaft supported by a plurality of radial active magnetic bearings 41.1, 41.2, 41.3, 41.4 and by one axial active magnetic bearing 42. The position of this latter may be different from the one shown in FIG. 3. The rotary machines are arranged in the following sequence, from left to right in the figure: electric generator 29 arranged between bearings 41.1 and 41.2; turboexpander 25, arranged between bearings 41.2 and 41.3; compressor 27 arranged between bearing 41.3 and 41.4. In the exemplary embodiment of FIG. 3 there is neither reheating nor intercooling. A single inlet flange and a single outlet flange are provided for the turboexpander 25 and a single inlet flange and a single outlet flange are provided for the compressor 27.

In the embodiment of FIG. 3, as well as in other embodiments disclosed later on, the turboexpander 25 can be a radial turboexpander, e.g. a centripetal turboexpander, or an axial turboexpander, or a hybrid axial-radial turboexpander. Similarly, the compressor 27 can be a radial compressor, i.e. a centrifugal compressor, an axial compressor, or a hybrid axial-radial compressor.

In the embodiment of FIG. 3, as well as in other embodiments disclosed later on, the turboexpander 25 can be a single-section turboexpander. In preferred embodiments, however, the turboexpander 25 is a multi-section turboexpander. Similarly, the compressor 27 can be a single-section, or preferably a multi-section compressor.

The sequence in which the rotary machines are arranged can be different from the one illustrated in FIG. 3. For example, the sequence may be (again from left to right in the figure): electric generator, compressor, turboexpander.

In currently preferred embodiments, however, the turboexpander 25 is arranged in a central position, between the electric generator 29 and the compressor 27. Since these latter are driven machines, by arranging the turboexpander 25 therebetween, the transmission of mechanical power along the shaft line 21 is optimized.

Moreover, the orientation of the turbomachines may be selected in various ways, as far as the inlet and outlet are concerned. In preferred embodiments, however, the turboexpander 25 is arranged with the discharge side oriented towards the electric generator, as shown in FIG. 3, such that less thermal load is applied to the electric generator 29.

Figure 4:
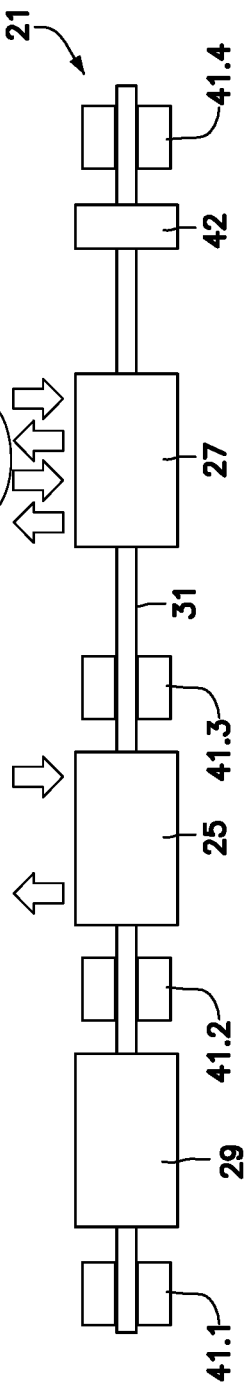

FIG. 4 illustrates the same arrangement as in FIG. 3 and the same reference numbers designate the same parts as in FIG. 3. In FIG. 4, however, the compressor 27 is an intercooled multi-section compressor, as schematically illustrated at IC. The compressor 27 thus comprises two inlet flanges and two outlet flanges. Partly compressed gas from a first compressor section is cooled in an intercooler (see intercooler 37, FIG. 2) and delivered to the second compressor section for further compression.

Figure 5:
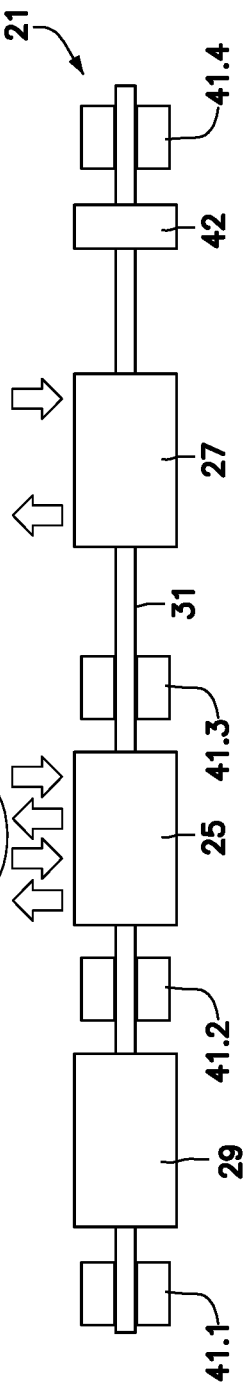

FIG. 5 illustrates the same arrangement as in FIG. 3 and the same reference numbers designate the same parts as in FIG. 3. In FIG. 5, however, the turboexpander 25 is a reheated multi-section turboexpander, as schematically illustrated at RH. The turboexpander 25 has two inlet flanges and two outlet flanges. Working fluid partly expanded in the high-pressure turboexpander section is reheated prior to be delivered to the inlet of the second turboexpander section, as schematically shown in FIG. 2.

Figure 6:
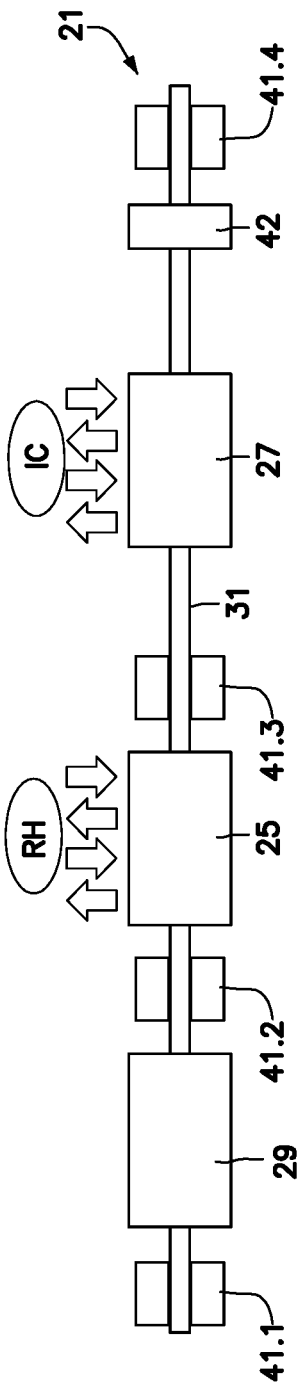

FIG. 6 illustrates the same arrangement as in FIG. 3, but using an intercooled, multi-section compressor 27 (see IC) and a multi-section reheated turboexpander 25 (see RH).

While in the embodiments of FIGS. 3, 4, 5 and 6 the shaft line 31 is formed as a single shaft, in other embodiments the shaft line 31 may include two or more shaft line sections, i.e. two or more shafts coupled to one another by respective joints.

The embodiments of FIGS. 7, 8, 9 and 10 are similar to the embodiments of FIGS. 3, 4, 5, 6, but the shaft line 31 is formed by two shaft line portions, i.e. two shafts, labeled 31.1 and 31.2, coupled to one another by a joint 51.

The joint 51 can be a mechanical joint, such as a flexible joint or a rigid joint, such as a Hirth joint. In other embodiments, a magnetic joint can be used instead. If a magnetic joint is used, the casing 21 can be in actual fact a casing arrangement formed by two separate casings, each hermetically sealed, i.e. without any mechanical rotary part protruding outside the casing or casing portion. The torque along the shaft line is transmitted magnetically through adjacent casings.

In the embodiment of FIGS. 7, 8, 9 and 10 the joint 51 is advantageously arranged between the electric generator 29 and the turboexpander 25. If a magnetic joint 51 is used, the generator casing is physically isolated from the turboexpander and compressor casing. This allows isolating the generator cooling gas system from the working fluid circuit and controlling generator windage losses.

As mentioned above in connection with FIGS. 3, 4, 5 and 6, the mutual position of the electric generator 29, turboexpander 25 and compressor 27, as well as the position of the thrust bearing 42 can be different than the one illustrated.

The use of joints 51, in particular flexible or magnetic joints, along the shaft line 31 reduces radial coupling of the shafts or shaft line portions at both sides of the joint and mitigates rotor dynamic risks.

In the embodiments of FIGS. 7, 8, 9 and 10 a larger number of radial active magnetic bearings 41 is required, since a radial bearing is required at each side of the joint 51.

Figure 11:
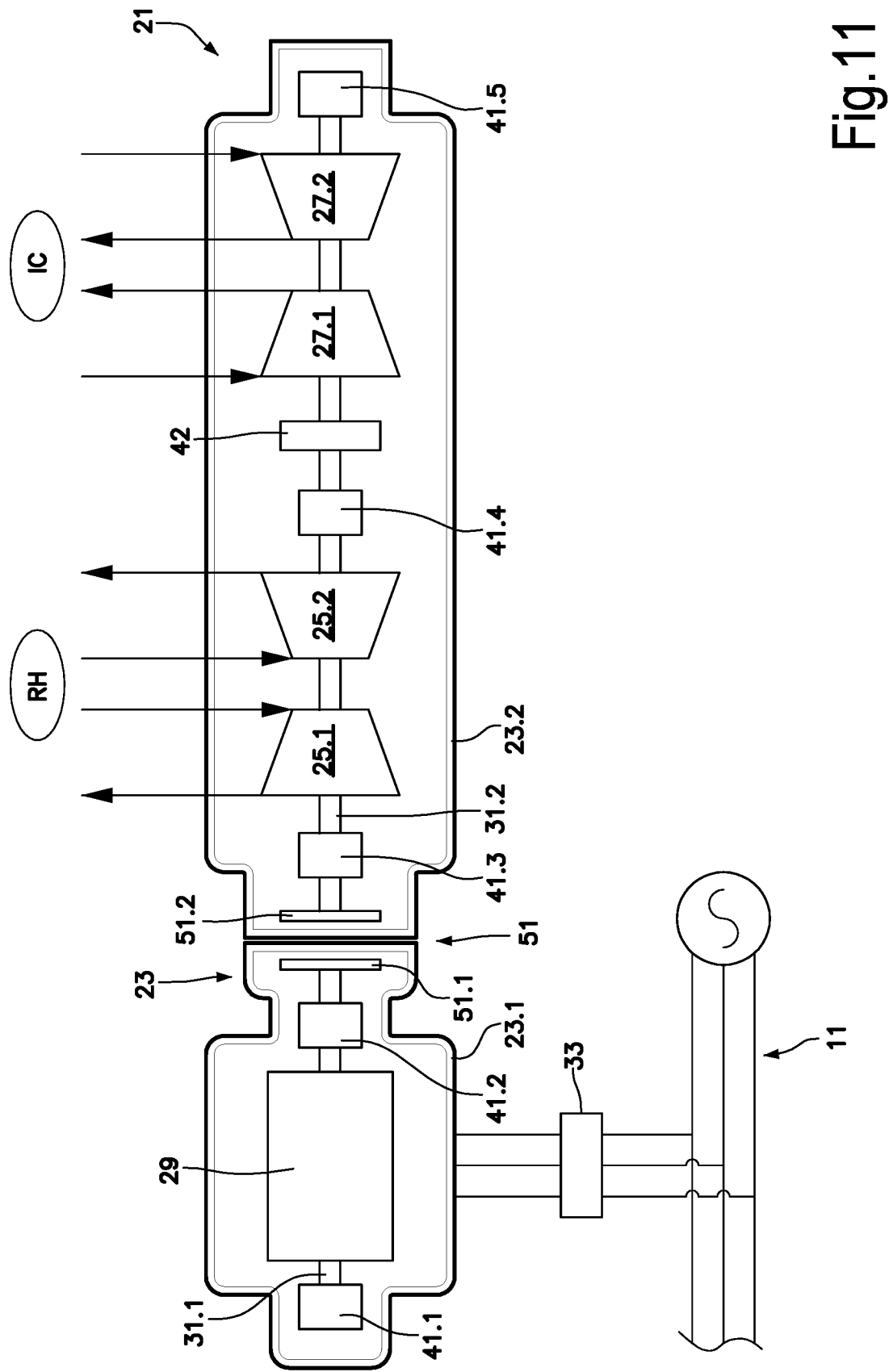
FIG. 11 illustrates a schematic of a further embodiment of an integrated turboexpander-generator with a magnetic joint.

While in the embodiments described above the hermetically sealed casing arrangement includes a single casing, if one or more magnetic joints are provided along the shaft line 31, the casing arrangement can be formed by two or more separate casings or casing portions. One possible embodiment using a magnetic joint and two casings joined to one another to form a hermetically sealed casing arrangement is shown in FIG. 11. The integrated turboexpander-generator is again labeled 21 and the various components thereof are labeled with the same reference numbers used in FIGS. 3 to 10.

The integrated turboexpander-generator 21 includes a hermetically sealed casing arrangement 23, which comprises a first casing or casing portion 23.1 and a second casing or casing portion 23.2 arranged in sequence and mechanically coupled to one another.

The turboexpander 25 comprises a first turboexpander section 25.1 and a second turboexpander section 25.2 and is provided with reheating (RH). The compressor 27 is an intercooled compressor (IC) and comprises a first compressor section 27.1 and a second compressor section 27.2. The turboexpander 25 and the compressor 27 are housed in casing portion 31.2 and are supported on shaft line portion 31.2. This latter is supported by radial bearings 41.3, 41.4, 41.5 and by thrust bearing 42.

The electric generator 29 is housed in the casing portion 23.1 and is supported therein for rotation on shaft line portion 31.1, by means of two radial bearings 41.1 and 41.2.

A magnetic joint 51 connects the shaft line portion 31.1 and the shaft line portion 31.2 and transmits torque generated by the turboexpander 25 from the shaft line portion 31.2 to the shaft line portion 31.1, to drive the electric generator 29.

The magnetic joint 51 comprises a first magnetic joint portion 51.1 housed in casing portion 23.1 and a second magnetic joint portion 51.2 housed in casing portion 23.2. The two portions of the magnetic joint are coupled magnetically but not mechanically, such that they can be separated from one another by solid walls of adjoining first and second casing portions 23.1 and 23.2. Power is transmitted through the facing walls of the casing portions through the magnetic field of the magnetic joint 51.

When a casing arrangement comprising two separate casing portions 23.1 and 23.2 is used, a complete separation is obtained between the interior of the two casing portions.

In the exemplary embodiment of FIG. 11 the electric generator 29 is thus hermetically isolated from the turbomachines and no rotary seals are required along the shaft line 31, between the electric generator 29 and the two turbomachines, namely the turboexpander 25 and the compressor 27.

Figure 13:
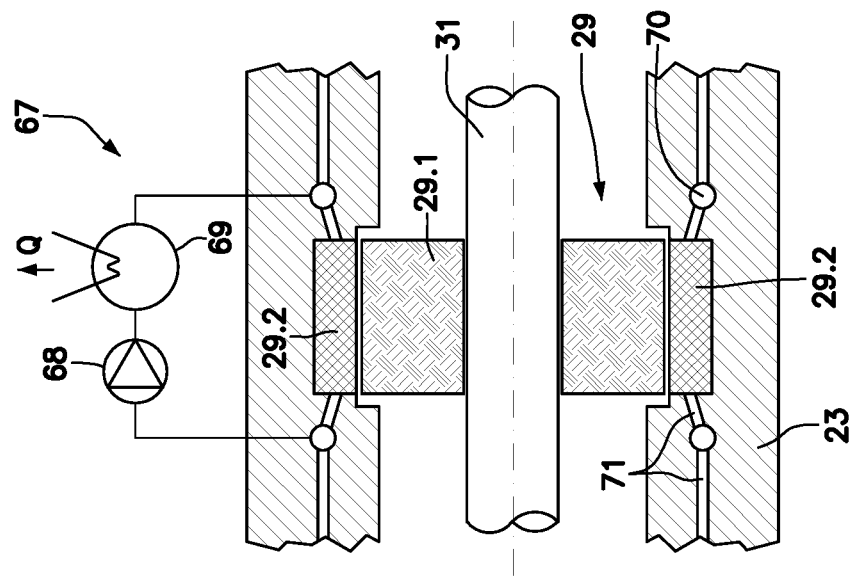
FIG. 13 illustrates a schematic sectional view of the electric generator and relevant cooling circuit.
Figure 12:
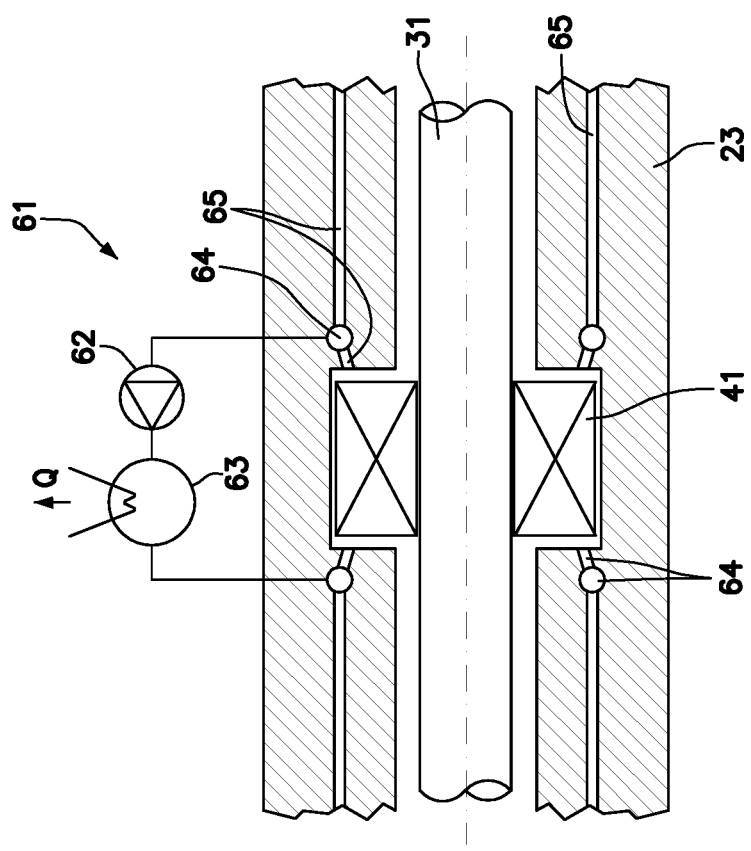
FIG. 12 illustrates a schematic sectional view of an active magnetic bearing and relevant cooling circuit.

As mentioned above, the active magnetic bearings 41, 42 and the electric generator 29 can be provided with a cooling circuit using the working fluid processed by the integrated turboexpander-generator as a cooling medium. FIGS. 12 and 13 show schematics of an active magnetic bearing 41 and of the electric generator 29 with relevant schematically represented cooling circuit.

A cooling circuit 61 for the active magnetic bearings 41, 42 is shown in FIG. 12 and includes a circulating pump or fan 62 and a heat exchanger 63, through which the cooling medium is circulated to discharge heat removed from the active bearings 41, 42. Reference numbers 64, 65 indicate cavities and ducts for the circulation of the cooling medium through the active magnetic bearings. 41, 42.

A cooling circuit 67 for the electric generator 29 is schematically shown in FIG. 13. The electric generator 29 is represented as including a rotor 29.1 rotationally mounted on shaft 31 and a stator 29.2 stationarily housed in the casing 23. A pump or fan 68 circulates the cooling medium thorough a heat exchanger 69 to remove heat therefrom. Cavities 70 and ducts 71 are disposed inside the casing 23 for circulating the cooling medium through the stator 29.2 of the electric generator 29.

The cooling circuits 61 and 67 may be combined in a single cooling circuit.

By using the same working fluid as a cooling medium, the system consisting of the integrated turboexpander-generator 21 and relevant cooling circuit(s) can be hermetically sealed, thus avoiding leakages of working fluid towards the environment surrounding the casing 23.

While the invention has been described in terms of various specific embodiments, it will be apparent to those of ordinary skill in the art that many modifications, changes, and omissions are possible without departing form the spirit and scope of the claims.

The invention claimed is:

1. An integrated hermetically sealed turboexpander-generator, comprising:
   a pair of hermetically sealed casings comprising a first casing and a second casing,
   the first casing enclosing;
      a turboexpander;
      a fluid pressurizing turbomachine;
      a first shaft having a first end and a second end; and
      active magnetic bearings disposed on the shaft,
      wherein the turboexpander and the fluid pressurizing turbomachine are arranged on the first shaft with the turboexpander disposed between a first active magnetic bearing and a second active magnetic bearing and the fluid pressurizing turbomachine disposed on the second end between the second active magnetic bearing and a third active magnetic bearing, and
   the second casing enclosing:
      an electric generator;
      a second shaft having a first end and a second end; and
      a fourth active magnetic bearing and a fifth active magnetic bearing disposed on the second shaft,
      wherein the electric generator is arranged on the second shaft between the fourth active magnetic bearing and the fifth active magnetic bearing, and a magnetic joint adjoining the first end of the first shaft and the first end of the second shaft.

2. The turboexpander-generator of claim 1, wherein the fluid pressurizing turbomachine comprises a compressor.

3. The turboexpander-generator of claim 1, wherein the fluid pressurizing turbomachine comprises a multi-section turbomachine.

4. The turboexpander-generator of claim 1, wherein the fluid pressurizing turbomachine comprises an intercooled turbomachine.

5. The turboexpander-generator of claim 1, wherein the turboexpander comprises a multi-section turboexpander.

6. The turboexpander-generator of claim 1, wherein the turboexpander comprises a reheated turboexpander.

7. The turboexpander-generator claim 1, wherein the turboexpander comprises a gas inlet end facing the fluid pressurizing turbomachine and a gas outlet end facing the electric generator.

8. The turboexpander-generator of claim 1, wherein the fluid pressurizing turbomachine comprises a pump.

9. The turboexpander-generator of claim 1, wherein the fluid pressurizing turbomachine comprises a multi-section turbomachine with two sections.

10. The turboexpander-generator of claim 1, wherein the turboexpander comprises a multi-section turboexpander with two sections.

11. A thermodynamic system comprising:
a waste heat source adapted to transfer heat to a working fluid processed through an integrated turboexpander-generator according to claim 1,
wherein the turboexpander-generator is adapted to convert part of the waste heat into electrical power.

* * * * *